US012780128B2

(12) United States Patent

Bos et al.

(10) Patent No.: US 12,780,128 B2

(45) Date of Patent: Nov. 3, 2026

(54) INTEGRATED ENERGY STORAGE DEVICE

(71) Applicant: BAUER ENERGY SOLUTIONS, LLC, Grand Rapids, MI (US)

(72) Inventors: Robert G. Bos, Grand Haven, MI (US); Andrew J. Manning, Randolph, NJ (US); Daren Rathbun, Coldwater, MI (US)

(73) Assignee: BAUER ENERGY SOLUTIONS, LLC, Grand Rapids, MI (US)

( * ) Notice: Subject to any disclaimer, the term of this patent is extended or adjusted under 35 U.S.C. 154(b) by 176 days.

(21) Appl. No.: 18/666,950

(22) Filed: May 17, 2024

(65) Prior Publication Data

US 2024/0383421 A1 Nov. 21, 2024

Related U.S. Application Data

(60) Provisional application No. 63/503,202, filed on May 19, 2023.

(51) Int. Cl.

*B60R 16/033* (2006.01)
*B60T 7/20* (2006.01)

(Continued)

(52) U.S. Cl.

CPC .............. *B60R 16/033* (2013.01); *B60T 7/20* (2013.01); *G07C 5/008* (2013.01); *H02J 7/865* (2026.01)

(58) Field of Classification Search

CPC ......... B60R 16/033; B60T 7/20; G07C 5/008; H02J 7/0068

(Continued)

(56) References Cited

U.S. PATENT DOCUMENTS

| | | | | |
|---|---|---|---|---|
| 3,110,507 | A * | 11/1963 | Riner | B60T 13/58 180/68.5 |
| 4,398,771 | A * | 8/1983 | McCurry | B60T 7/20 188/3 R |

(Continued)

OTHER PUBLICATIONS

Powertronics Inc., "Power-Station A.I.O," https://powertronics.us/products/pt-3000/ Willimantic, CT (May 2024).

(Continued)

*Primary Examiner* — Kurt Philip Liethen
*Assistant Examiner* — John D Bailey
(74) *Attorney, Agent, or Firm* — PRICE HENEVELD LLP

(57) ABSTRACT

A self-contained energy storage, distribution, and monitoring device for a vehicle comprises a single enclosed housing mounted within the vehicle. A VDC battery a VDC converter, a 110 VAC power input, a 110 VAC inverter, and a 110 VAC battery charger, and a VDC power input are each disposed within the enclosed housing. A controller is also disposed within the enclosed housing and is operably coupled with the VDC battery, the VDC converter, the 110 VAC power input, the 110 VAC inverter, and the 110 VAC battery charger. The controller is adapted to provide charging and discharging control of the VDC battery, switching of the VDC converter depending on the presence or absence of a 110 VAC power supply, and switching of the 110 VAC inverter and 110 VAC battery charger depending on the presence or absence of a 110 VAC power supply.

22 Claims, 11 Drawing Sheets

(51) Int. Cl.
*G07C 5/00* (2006.01)
*H02J 7/00* (2026.01)

(58) Field of Classification Search
USPC ............................................................ 701/70
See application file for complete search history.

(56) References Cited

U.S. PATENT DOCUMENTS 4,401,935 A * 8/1983 Yerkes ...................... H02J 7/35 320/128
5,421,600 A * 6/1995 Jones ....................... B60D 1/36 280/428
6,499,814 B1 * 12/2002 Mixon ...................... B60T 7/20 303/7
6,619,759 B2 * 9/2003 Bradsen ................ B60T 13/662 188/3 R
6,752,474 B1 * 6/2004 Olberding ............. B60T 13/741 188/3 R
7,186,478 B2 * 3/2007 Forlino ............... H01M 50/202 429/122
7,875,993 B2 * 1/2011 Godo ...................... B60T 8/885 701/70
8,552,591 B2 * 10/2013 Choi ...................... H02J 3/381 307/66
8,712,616 B2 * 4/2014 Treharne ................... B60L 7/14 703/2
8,829,799 B2 * 9/2014 Recker ..................... H02H 3/08 315/159
8,975,859 B2 * 3/2015 Takehara ............... G01D 4/004 320/136
9,026,311 B1 * 5/2015 Pieronek ............... B60T 8/1708 280/455.1
9,099,893 B2 * 8/2015 Schmiegel .............. H02J 3/381
9,150,201 B2 * 10/2015 Smith ....................... B60T 7/20
9,315,173 B1 * 4/2016 Gray ....................... B60T 7/042
9,555,753 B2 * 1/2017 James ..................... B60R 16/03
9,663,079 B2 * 5/2017 Yamamoto .............. B60T 7/085
9,711,967 B1 * 7/2017 Czarnecki ............... H02J 3/381
9,758,138 B2 * 9/2017 Albright ............... B60T 8/1708
9,893,560 B2 * 2/2018 Choe ......................... H02J 3/02
10,040,437 B2 * 8/2018 Albright ................. B60T 8/323
10,112,499 B2 * 10/2018 Shi .......................... B60L 53/14
10,432,006 B2 10/2019 Baba et al.
10,693,315 B2 * 6/2020 Kydd ...................... B60L 53/51
10,946,841 B2 * 3/2021 Cekola ...................... B60T 7/20
11,050,259 B2 * 6/2021 Sugeno ..................... H02J 3/32
11,050,260 B2 * 6/2021 Narla ........................ H02J 3/38
11,634,109 B2 * 4/2023 Goers ................... B60T 13/683 701/70
11,858,484 B2 * 1/2024 Brinkman ............... B60T 8/323
11,901,810 B2 * 2/2024 Dent ...................... H02H 11/00
11,912,082 B1 * 2/2024 Bailey .................... B60D 1/481
12,485,837 B2 * 12/2025 Cekola ................... B60Q 1/305
2002/0123837 A1 * 9/2002 Eccleston ............... B60T 17/22 303/121
2006/0071549 A1 * 4/2006 Chesnut .................... B60T 7/16 303/3
2008/0189000 A1 * 8/2008 Duong ...................... B60T 7/22 340/928
2009/0204303 A1 * 8/2009 Leschuk ................... B60T 7/12 701/71
2014/0042973 A1 * 2/2014 Kawahara ........... H01M 10/441 320/118
2014/0239914 A1 * 8/2014 Igarashi .................. B60L 58/13 320/134
2015/0022155 A1 * 1/2015 Yamamoto ............ H01M 10/44 320/118
2015/0202977 A1 * 7/2015 McCall .................. B60L 58/21 701/22
2015/0360568 A1 * 12/2015 Champagne ............ B60L 1/003 296/156
2016/0049819 A1 * 2/2016 Butler ..................... B60L 53/20 320/105
2016/0118846 A1 * 4/2016 Huang ................ H01M 10/465 320/101
2016/0137149 A1 * 5/2016 Kamachi ................... B60L 1/00 307/10.1
2018/0079395 A1 * 3/2018 Cekola ...................... B60T 7/08
2018/0175660 A1 * 6/2018 Hara ..................... H01M 10/44
2019/0039578 A1 * 2/2019 Sanchez ................ B60T 17/221
2019/0217831 A1 * 7/2019 Viele ...................... B60D 1/245
2019/0222028 A1 * 7/2019 Dibachi .................... H02J 3/32
2019/0273393 A1 * 9/2019 Chen ....................... H02J 3/381
2019/0280508 A1 * 9/2019 Tabib ................. G01R 31/3842
2019/0337499 A1 * 11/2019 Hiller ...................... B60T 7/042
2020/0001807 A1 * 1/2020 Pighi ....................... B60L 53/34
2020/0047622 A1 * 2/2020 Asr .......................... B60K 6/48
2020/0072178 A1 * 3/2020 Berkson .................. B60R 16/03
2021/0197781 A1 * 7/2021 Lucy ..................... B60T 13/662
2021/0221250 A1 * 7/2021 Hiratsuka ............... B60L 53/16
2021/0309108 A1 * 10/2021 Sanchez ................. B60K 35/10
2021/0376612 A1 * 12/2021 Barooah .............. G05B 13/042
2022/0069613 A1 * 3/2022 Reddy ..................... H02J 9/061
2022/0242341 A1 * 8/2022 Westerlind ................ B60L 1/00
2022/0332216 A1 * 10/2022 Sakata .................... B60L 55/00
2023/0036001 A1 * 2/2023 Goodrich .............. B60R 16/033
2023/0058243 A1 * 2/2023 Boucher ............... B60R 16/033
2023/0063049 A1 * 3/2023 Kim ...................... H01M 10/44
2023/0092625 A1 * 3/2023 Ito .......................... B60L 53/62 701/29.3
2023/0104789 A1 * 4/2023 Inui ......................... B60L 53/14 701/22
2023/0145675 A1 * 5/2023 Johannes ................. B60D 1/62 280/420
2023/0155482 A1 * 5/2023 Dent ...................... H02H 11/00 307/77
2023/0365024 A1 * 11/2023 Reid ........................ B60L 8/003
2024/0034161 A1 * 2/2024 Mimatsu ............... B60L 53/122
2024/0042861 A1 * 2/2024 Mergener .................. B60L 1/00
2024/0270215 A1 * 8/2024 Hynd .................... B60T 13/686

OTHER PUBLICATIONS

Powertronics Inc., "Power-Station," https://powertronics.us/solar-panels/ Willimantic, CT (May 2024).
Powertronics Inc., "Power-Station XL," https://powertronics.us/power-station-xl/ Willimantic, CT (May 2024).
Powertronics Inc., "EX-5000," https://powertronics.us/products/ex-5000/ Willimantic, CT (May 2024).
Powertronics, Inc., "EX-10K," https://powertronics.us/products/p-o-w-e-r-battery/ Willimantic, CT (May 2024).
Renogy, "Renogy 300 Power Station," https://renogy.com/shop-products/renogy-renewed/, Ontario, CA (May 2024).

* cited by examiner

INTEGRATED ENERGY STORAGE DEVICE

CLAIM OF PRIORITY

This application claims priority under 35 U.S.C. § 119 and/or 35 U.S.C. § 120 to commonly assigned, co-pending, and related U.S. Provisional Application No. 63/503,202, filed May 19, 2023, entitled "Integrated Energy Storage Device," the entire disclosure of which is incorporated herein by reference.

FIELD OF THE DISCLOSURE

The present disclosure generally relates to a device for providing a self-contained energy storage, distribution, and monitoring device adapted for a vehicle, and more particularly, a self-contained unit for providing automatic braking control to a towed vehicle such as a recreational vehicle by actuating an emergency application of an electrically actuated braking system for the towed vehicle.

BACKGROUND OF THE DISCLOSURE

Motor vehicles, particularly those powered by internal combustion engines, have typically relied on a common lead acid battery (or batteries) mounted within the motor vehicle to provide electrical power for the operation of on-board devices, such as lights and entertainment centers. Such devices typically operate on a 12 VDC power source, such as the battery or an alternator. In the case of larger, self-propelled vehicles, such as recreational vehicles (RV) configured as motorcoaches. buses, and semi-trucks, power for additional devices that operate on a higher voltage (typically 110 VAC), such as air conditioners and refrigerators, may be required. To meet these needs, not only an appropriate power source is needed, either 12 VDC or 110 VAC (depending on the device), but additional components, such as a 12 VDC converter, a 110 VAC inverter, and a 110 VAC battery charger may be needed. In addition, a 110 VAC power input and, more recently, a solar battery charger input may be required. Thus, such larger vehicles, particularly RV coaches, may require multiple components that are located throughout the motor vehicle. Such configurations have been expensive and complicated to manufacture, assemble, and maintain. A self-contained energy storage, distribution, and monitoring device that provides all the energy storage needs of such motor vehicles is desired.

In addition, towed vehicles, such as trailers, may present potential hazards if the towed vehicle breaks free from the towing vehicle while in transit. Small utility trailers present a relatively small hazard. Larger trailers, particularly RVs configured as travel trailers, may present a significant hazard if they break free from the towing vehicle. As a result, federal law (49 C.F.R. § 393.43 (d)) requires that such larger trailers be equipped with brakes that apply automatically and immediately upon breakaway from the towing vehicle. The brakes must remain in the applied position for at least 15 minutes. To accomplish this functionality, trailers, particularly RVs equipped with electrically actuated braking systems integrated with the towing vehicle's braking system, typically rely on a common lead acid battery (or batteries) mounted on the RV, which has been historically and commonly mounted on the tongue of the trailer, for electrical energy to apply the electrically actuated braking systems of the trailer in the event of the towed vehicle breaking free from the towing vehicle while in transit. A device to improve the performance and application of the electrically actuated braking systems of the trailer in the event of the towed vehicle breaking free from the towing vehicle while in transit was desired.

SUMMARY OF THE DISCLOSURE

According to a first aspect of the present disclosure, a self-contained energy storage, distribution, and monitoring device for a vehicle comprises a single enclosed housing mounted within the vehicle. A VDC battery is disposed within the enclosed housing. A VDC converter, a 110 VAC power input, a 110 VAC inverter, and a 110 VAC battery charger are each also disposed within the enclosed housing. A VDC power input is disposed within the enclosed housing. A controller is further disposed within the enclosed housing and is operably coupled with the VDC battery, the VDC converter, the 110 VAC power input, the 110 VAC inverter, and the 110 VAC battery charger. The controller is adapted to provide charging and discharging control of the VDC battery, switching of the VDC converter depending on the presence or absence of a 110 VAC power supply, and switching of the 110 VAC inverter and 110 VAC battery charger depending on the presence or absence of a 110 VAC power supply.

According to another aspect of the present disclosure, a self-contained energy storage, distribution, and monitoring device is disclosed that is adapted to actuate automatic braking control of, and is mounted on, a towed vehicle equipped with an electrically actuated braking system in electrical communication with a braking system of a towing vehicle. This includes a breakaway switch mounted on the towed vehicle and operably coupled with the towing vehicle. A controller is mounted on the towed vehicle and is operably coupled with the breakaway switch. An energy storage system supervisor module mounted on the towed vehicle and is operably coupled with the controller, wherein the energy storage system supervisor module is in selective electrical communication with the electrically actuated braking system of the towed vehicle. The controller directs electrical energy from the energy storage system supervisor module to the electrically actuated braking systems of the trailer in the event of the towed vehicle breaking free from the towing vehicle while in transit.

According to another aspect of the present disclosure, a self-contained energy storage, distribution, and monitoring device adapted to actuate automatic braking control of, and mounted on, a towed vehicle equipped with an electrically actuated braking system in electrical communication with a braking system of a towing vehicle is disclosed. The self-contained energy storage, distribution, and monitoring device includes a breakaway switch mounted on the towed vehicle and is operably coupled with the towing vehicle. A controller is mounted on the towed vehicle and operably coupled with the breakaway switch. An energy storage system supervisor module is mounted on the towed vehicle and is operably coupled with the controller, wherein the energy storage system supervisor module is in selective electrical communication with the electrically actuated braking system of the towed vehicle. The breakaway switch, controller, and energy storage system supervisor module are enclosed within a single housing mounted to the towed vehicle and the controller is in signal communication with the breakaway switch, the electrically actuated braking system, and the energy storage system supervisor module via an internal bus and bus protocol. The controller directs electrical energy from the energy storage system supervisor module to the electrically actuated braking systems of the towed vehicle in the event of the towed vehicle breaking free from the towing vehicle while in transit.

These and other features, advantages, and objects of the present disclosure will be further understood and appreciated by those skilled in the art by reference to the following specification, claims, and appended drawings.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

Figure 1:
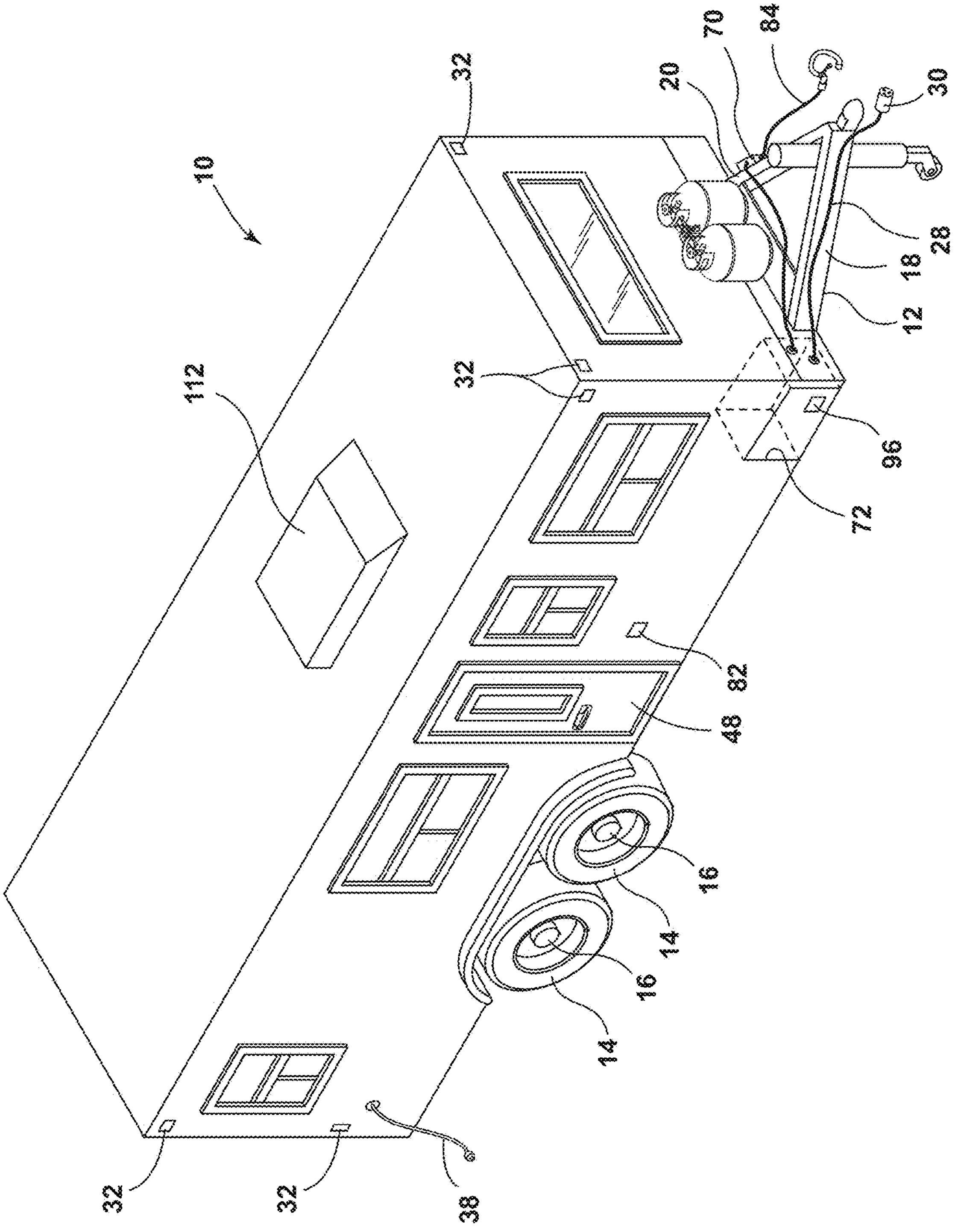
FIG. 1 is a perspective view of a towed vehicle equipped with a self-contained energy storage, distribution, and monitoring device adapted to actuate automatic braking control of the towed vehicle equipped with an electrically actuated braking system in electrical communication with a braking system of a towing vehicle according to the present disclosure.

The components in the Figures are not necessarily to scale, emphasis instead being placed upon illustrating the principles described herein.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "inboard," "outboard," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a self-contained energy storage, distribution, and monitoring device for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Various example embodiments (a.k.a., exemplary embodiments) will now be described more fully with reference to the accompanying drawings in which some example embodiments are illustrated. In the Figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being “connected,” “coupled,” or “operably coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

The terminology used herein is for the purpose of describing particular embodiments only and is not intended to be limiting of example embodiments. As used herein, the singular forms “a,” “an” and “the” are intended to include the plural forms as well, unless the context clearly indicates otherwise. Thus, for example, reference to “a component” includes embodiments having two or more such components unless the context clearly indicates otherwise.

It will be further understood that the terms “comprises,” “comprising,” “includes” and/or “including,” when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be considered in the specific context this definition is given herein.

Referring generally to FIGS. 1-11, and more particularly to FIG. 1, a representative embodiment of a towed vehicle 10 in accordance with the present disclosure is illustrated. The self-contained energy storage, distribution, and monitoring device of the present disclosure is not limited to such a towed vehicle 10, but may also be advantageously applied to self-propelled vehicles, such as recreational vehicles configured as motorcoaches, buses, and semi-trucks.

Towed vehicle 10 may be configured as a recreational vehicle having a main enclosed structure, within which living quarters or storage space, or combination thereof, may be provided. The towed vehicle 10, as is known, is supported by a frame 12 upon which are mounted one or more axles 14 to which are attached wheel and tire assemblies 16. A forward portion 18 of the frame 12, as is typical, may be provided with a tongue 20 to which a hitch ball coupler 22 is disposed at a distal end 24 thereof. A hitch ball (not shown) mounted on towing vehicle 26 (shown schematically in FIG. 5) designated to tow the towed vehicle 10 is received within the hitch ball coupler 22 to couple the towed vehicle 10 to the towing vehicle 26. A power coupling line or vehicle wiring harness 28 mounted on the towed vehicle 10 may be electrically coupled with the towing vehicle 26 via a connector 30, as is known, received within a socket connected to the electrical system of the towing vehicle 26 to provide power to the rear running, brake, and signal lights 32 of the towed vehicle 10 when the coupled towed vehicle 10 and the towing vehicle 26 are in motion.

As is known, such towed vehicles 10 and larger, self-propelled motor vehicles, particularly when configured as recreational vehicles, are unusual vehicles and have become essentially a home that can be moved on wheels from place to place. As such and as noted above, such towed vehicles 10 and larger, self-propelled motor vehicles have developed in the automotive space, and the electrical system has generally evolved as a 12-volt direct current (VDC) system, the same as the typical towing vehicle 26, such as motor vehicle configured as a car or light truck. Likewise, larger, self-propelled motor vehicles have evolved around an internal 12 VDC power supply. This has led to the development and use of many 12 VDC appliances, such as furnaces, refrigerators, pumps, lights, etc. As recreational vehicles have evolved from small campers to virtually full-time homes, the demand for power has continued to increase.

It should be noted that the system of the present disclosure is not limited to batteries or systems adapted for 12 VDC operation. The present disclosure expressly contemplates use with batteries and systems adapted for 24 VDC operation and batteries and systems adapted for 48 VDC (and potentially even higher) operation. For example, 48 VDC batteries and components may be more advantageous in certain circumstances, in that smaller wires and less resistive losses at connectors, better control, etc. may be obtained. Thus, reference herein to 12 VDC systems and components can be understood to include systems and components adapted to operate at higher voltage VDC, such as 24 VDC and 48 VDC.

However, particularly in the case of a conventional towed vehicle 10, an external 12 VDC power supply is typically not readily available unless the towed vehicle 10 is electrically coupled with a towing vehicle 26. Accordingly, a twin, interconnected power input protocol system has evolved. The first power input protocol is the external/internal 12 VDC power system described above and/or a 12 VDC battery 34 mounted on the towed vehicle 10, as described further below. The second power input protocol, based on the national power grid system, is a 110-volt alternating current (VAC) power system, commonly referred to as the “grid system.” Using the second power input protocol, such as when at a recreational vehicle park (or other location, including home), a 110 VAC power supply input 36 may be provided into which a power cord 38 from the towed vehicle 10 can be plugged. While this may provide a convenient continuous source of power, it requires a converter 40 to convert the 110 VAC to 12 VDC, for example, to operate the appliances on-board the towed vehicle 10 or larger, self-propelled motor vehicles noted above.

When not electrically coupled with a towing vehicle 26 or without access to a 110 VAC power supply input 36, such towed vehicles 10 or larger, self-propelled motor vehicles typically may rely on various power sources, such as a vehicle alternator (in the case of larger, self-propelled motor vehicles often providing 12 VDC), a stand-alone generator (often providing 110 VAC), a solar panel array (often providing either 12 VDC or 110 VAC), or a an on-board battery-based system. Since such towed vehicles 10 and larger, self-propelled motor vehicles started out based on a 12 VDC power supply, 12 VDC batteries 34 are typically employed to provide power when the towed vehicle 10 or larger, self-propelled motor vehicles was in a location where a grid system connection was not possible. Again, higher voltage VDC batteries and systems may be employed.

Such towed vehicles 10 and larger, self-propelled motor vehicles typically have used and still use lead acid batteries 34. Yet lead acid batteries 34 present several challenges: (1) they must be vented (as they can generate hydrogen and may cause an explosion); (2) if they are mounted outside the towed vehicle 10, battery capacity is diminished in cold weather; (3) the water level of deep discharge lead acid batteries 34 has to be maintained; (4) the voltage profile of a 12 VDC lead acid battery 34 is quite flat and gives little warning of not being able to provide the required power; and (5) lead acid batteries 34 have a very limited lifetime in such applications.

Operating on 12 VDC batteries 34 presents an additional limitation. When connected to the grid system, the grid system has a significant, if not almost infinite, pulse capacity. When motors or compressors of the appliances on board the towed vehicle 10 or larger, self-propelled motor vehicles start-up, the starting current surge can be as much as six times the running current. As is known, 12 VDC batteries 34 may have limited surge capacity and inverters 42 producing 110 VAC from a 12 VDC battery 34 often have an absolute fixed limit. This results in a situation where, if there are too many loads running when a surge occurs, the inverter 42 may disconnect due to an over-current event.

As certain towed vehicles 10 and larger, self-propelled motor vehicles, such as recreational vehicles, have evolved from simple campers to the more luxurious mobile homes, owners have demanded more amenities, such as air conditioning, television, computers, and other appliances that are generally operated by a 110 VAC power supply. While this is often no problem as a pass-through if the towed vehicle 10 or larger, self-propelled motor vehicle is connected to the grid system, such appliances may require an inverter 42 to convert 12 VDC power to 110 VAC and more 12 VDC batteries 34 to store more energy. More significantly, in the case of a conventional towed vehicle 10, the use of 12 VDC batteries for the towed vehicle's 10 increased electrical demands may compete with the 12 VDC power demands for emergency braking actuation of an electrically actuated braking system 46, bearing in mind that such towed vehicles 10 are equipped with the electrically actuated braking system 46 that apply automatically and immediately upon breakaway from the towing vehicle 26 that must remain in the applied braking position for at least 15 minutes.

That is, certain towed vehicles 10, particularly recreational vehicles, may be equipped with the electrically actuated braking system 46 integrated with the towing vehicle's 26 braking system, whereby the towing vehicle 26 provides variable DC voltage and/or current to the electrically actuated braking system 46 of the towed vehicle 10, proportional to the braking effort input of a driver of the towing vehicle 26 via a brake controller provided on the towing vehicle 26, as is known. The towed vehicle 10 has traditionally relied on the common lead acid 12 VDC battery 34 (or batteries) mounted on the towed vehicle 10 for electrical energy to apply the electrically actuated braking systems 46 of the towed vehicle 10 in the event of the towed vehicle 10 breaking free from the towing vehicle 26 while in transit. The overall power demands of the towed vehicle 10 create a question as to whether an additional battery may be needed. This is especially true as 12 VDC batteries 34 get larger and more expensive and manufacturers of towed vehicles 10, particularly recreational vehicles, work to contain costs and weight.

There is an additional consideration in the case of certain towed 10, particularly recreational vehicles. That is, after being transported and parked, after the towing vehicle 26 is disconnected, the electrically actuated braking system 46 may automatically lock the wheel and tire assemblies 16, which may prevent the towed vehicle 10 from moving if desired, for example, at an RV service center or an RV dealer lot. Moreover, leaving the electrically actuated braking system 46 locked will run down the 12 VDC battery 34. Relatedly, there is another risk to manufacturers and dealers. When the construction of the towed vehicle 10 is completed, the door 48 may be locked and the towed vehicle 10 may be either parked in the manufacturer's lot or transported to the dealer's lot, where it may be parked and sit idle for extended periods of time, sometimes exceeding a year. There is a risk that a light or an appliance in the towed vehicle 10 may inadvertently be left on, which may run the 12 VDC battery 34 down. This creates several problems: (1) if the 12 VDC battery 34 is dead, it is not then safe to move the towed vehicle 10, as the electrically actuated braking system 46 may not be powered; and (2) 12 VDC batteries 34 that sit discharged for an extended period tend to go dead.

Figure 2:
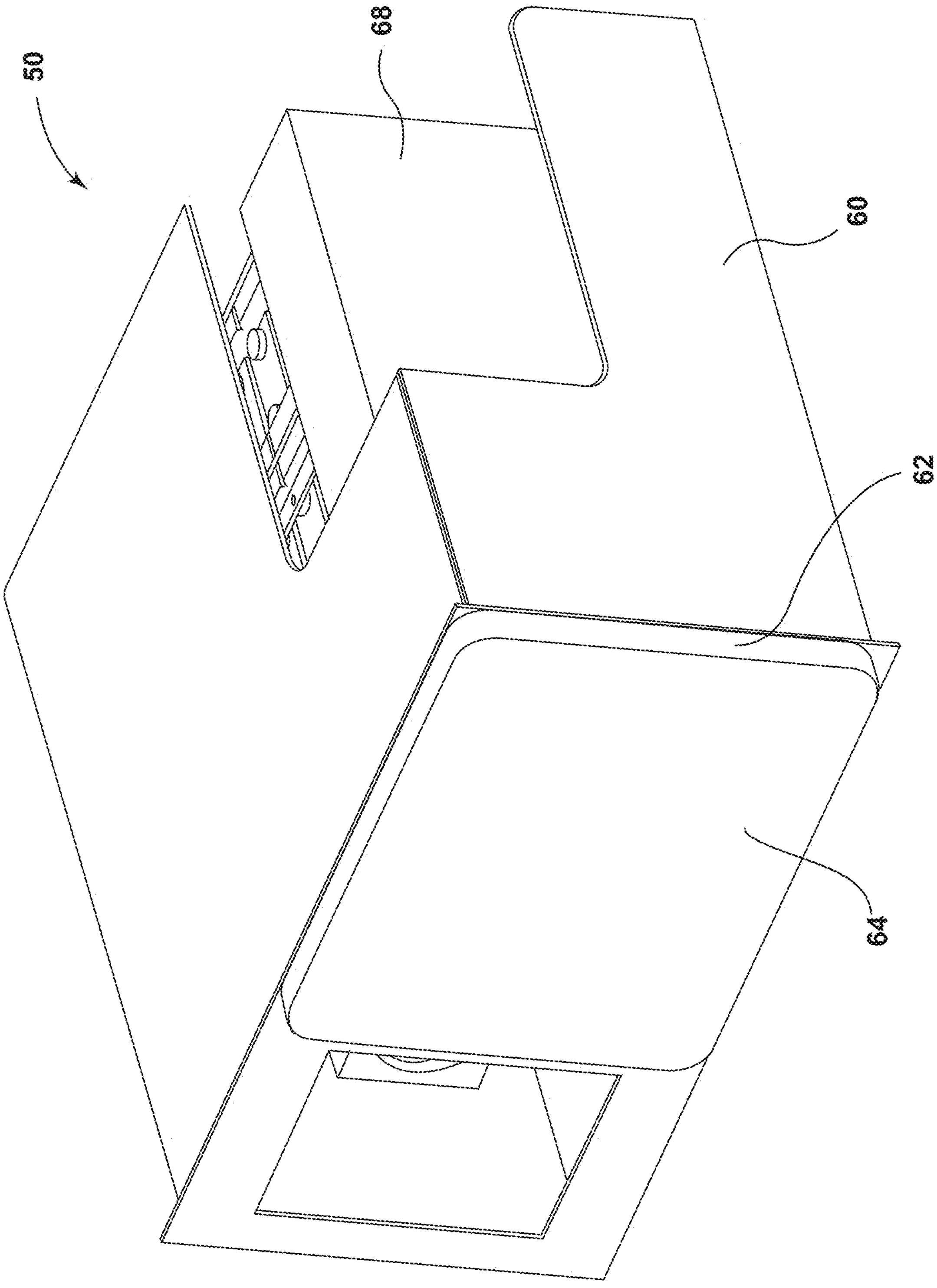
FIG. 2 is a side perspective view of the self-contained energy storage, distribution, and monitoring device shown in FIG. 1 adapted to actuate automatic braking control of the towed vehicle equipped with an electrically actuated braking system in electrical communication with a braking system of a towing vehicle according to the present disclosure.
Figure 3:
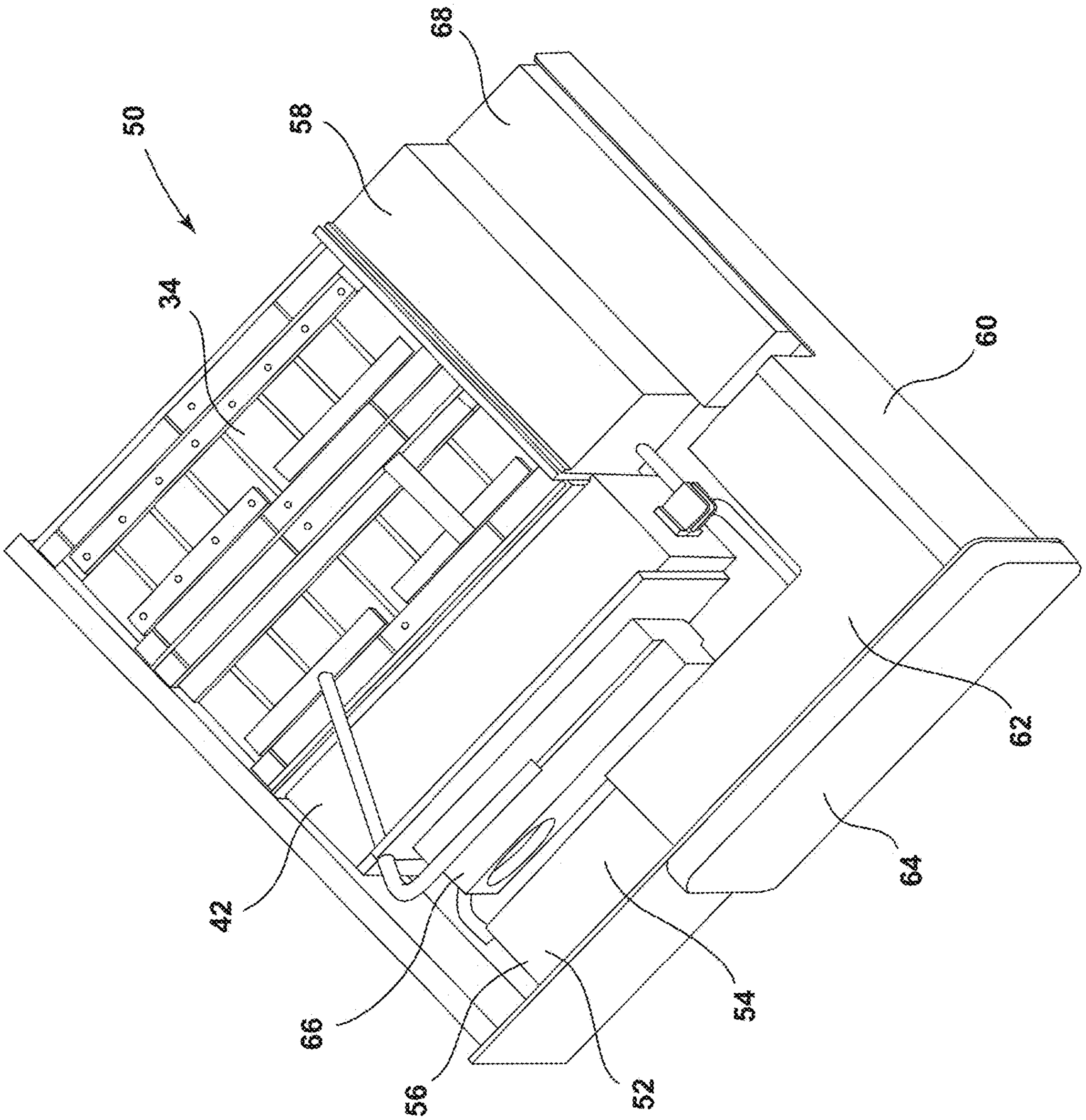
FIG. 3 is a top perspective view of the self-contained energy storage, distribution, and monitoring device shown in FIG. 2 according to the present disclosure.
Figure 4:
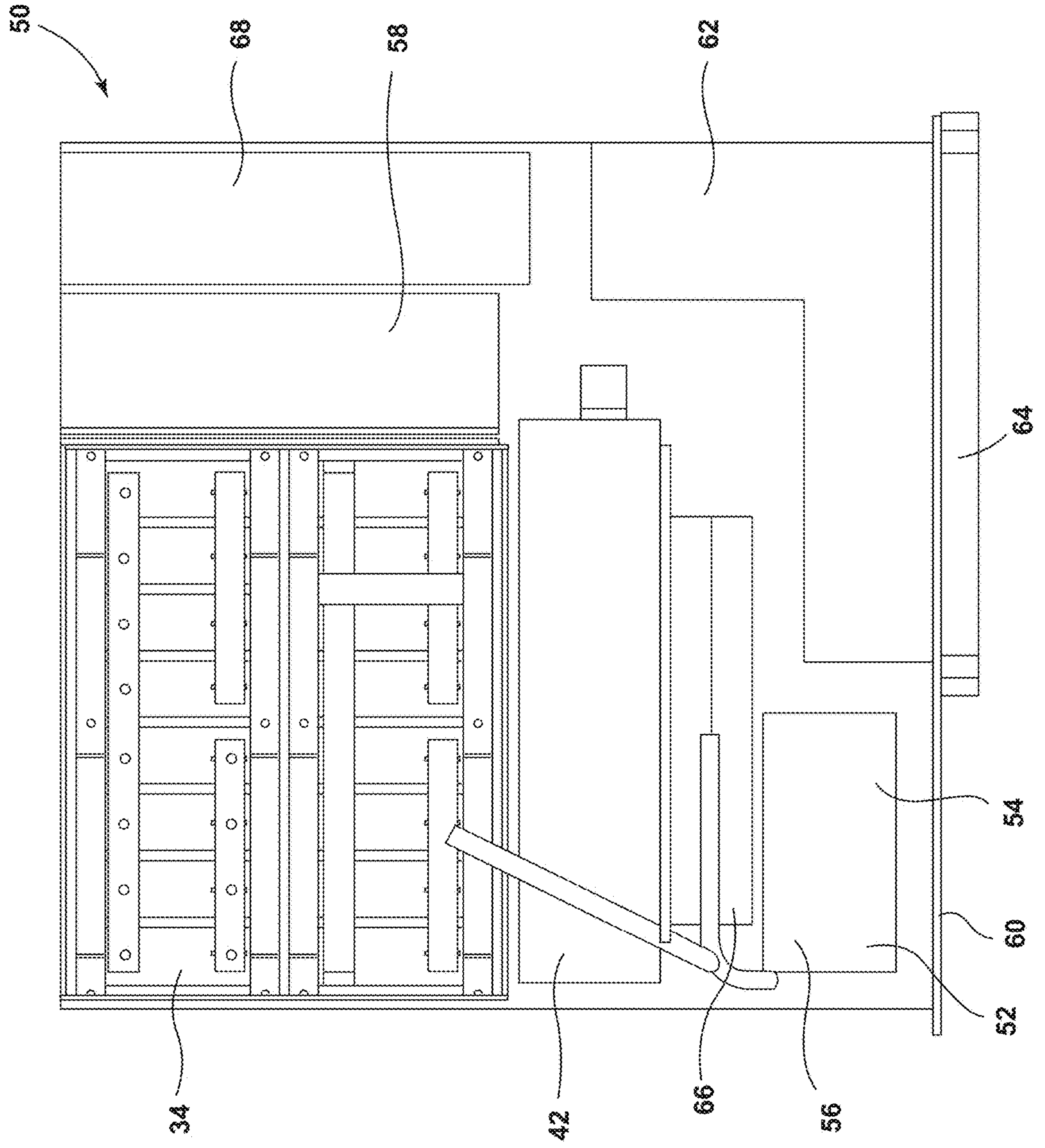
FIG. 4 is a top view of the self-contained energy storage, distribution, and monitoring device shown in FIG. 2 according to the present disclosure.

To address these and other considerations, disclosed herein is a self-contained energy storage, distribution, and monitoring device 50. The self-contained energy storage, distribution, and monitoring device 50 may include a controller 52 mounted on the towed vehicle 10 or larger, self-propelled motor vehicle. The controller 52 may include an energy storage system (ESS) supervisor module 54, an intelligent switching and load control (ISLC) module 56, and a solar charge module 58, as shown in FIGS. 2-4, all shown mounted in a box-like enclosed housing 60 having an externally facing standard circuit breaker and distribution panel 62 accessible on one external surface 64. The enclosed housing 60 may be sealed and made impermeable to moisture, dust, and other contaminants.

In the case of a towed vehicle 10, the controller 52 may include a battery management system (BMS) module 66 and an emergency braking system module 68. In such case, the ESS supervisor module 54 is in selective electrical communication with the electrically actuated braking system 46 of the towed vehicle 10 and in electrical communication with a breakaway switch 70 mounted on the towed vehicle 10 and operably coupled with the towing vehicle 26. As further illustrated in FIGS. 2-11, the controller 52 of the self-contained energy storage, distribution, and monitoring device 50 directs electrical energy from the ESS supervisor module 54 to the electrically actuated braking system 46 of the towed vehicle 10 in the event of the towed vehicle 10 breaking free from the towing vehicle 26 while in transit.

The self-contained energy storage, distribution, and monitoring device 50 of the present disclosure may thus be integrated into a single unit containing the aforementioned components, as depicted in FIGS. 2-4, to provide protection and a control circuit. To this end, the self-contained energy storage, distribution, and monitoring device 50 may be mounted in a convenient recess 72 in the towed vehicle 10, such as shown in FIG. 1, or larger, self-propelled motor vehicles, and connected with the towing vehicle 26 via the power coupling line 28 extending from and coupled with the towed vehicle 10 by the connector 30. Thus, any components that may have been previously individually mounted, along with the related wiring harnesses, are integrated within the single enclosure of the enclosed housing 60. The integrated single unit makes installation easier and eliminates extra wiring harnesses and connections, thus saving the manufacturer of the towed vehicle 10 or larger, self-propelled motor vehicle time and money.

As an additional benefit, in the case of a towed vehicle 10, the self-contained energy storage, distribution, and monitoring device 50 provides both a power source and monitors battery levels. Thus, a separate 12 VDC battery 34 may be eliminated. Furthermore, the self-contained energy storage, distribution, and monitoring device 50 provides a warning and status indication if there is not enough remaining energy left to power the electrically actuated braking system 46 should an emergency disconnect occur.

The self-contained energy storage, distribution, and monitoring device 50 thus provides a complete energy solution and may include, but is not limited to, 12 VDC batteries 34, chargers 78, converters 40, inverters 42, overall power distribution, electrically actuated braking system 46 power and user energy reporting and control. All major components are interconnected via a communications buss 100 and may connect to the towed vehicle's 10 or larger, self-propelled motor vehicle's communications network (such as CAN, RVCAN, or Bluetooth).

In the case of a towed vehicle 10, the breakaway switch 70 may be mounted to the tongue 20 and placed in electrical communication with the self-contained energy storage, distribution, and monitoring device 50 via the power coupling line 28. The power coupling line 28 may also extend from the breakaway switch 70, which may also be mechanically coupled with the towed vehicle 10, whereby in the event of the towed vehicle 10 breaking free from the towing vehicle 26 while in transit, the cable 84 is placed in tension and detached from the breakaway switch 70, and a corresponding electrical signal is delivered to the self-contained energy storage, distribution, and monitoring device 50 by the breakaway switch 70 via a towing disconnect circuit 154.

The controller 52 of the self-contained energy storage, distribution, and monitoring device 50 may include the ESS 54, BMS 66, the emergency braking system module 68 (in the case of a towed vehicle), and/or the solar charge module 58, as shown in FIGS. 2-4, all shown mounted in the box-like enclosed housing 60 having the externally facing standard circuit breaker and distribution panel 62 accessible on one surface 64. Also contained with the enclosed housing 60 may be the ESS supervisor module 54, the 12 VDC battery 34, as well as the 12 VDC converter 40, the 110 VAC inverter 42, the 110 VAC battery charger 78, the 110 VAC power supply input 36, and a solar battery charger input 86. The controller 52 may be adapted to provide charging and discharging control of the 12 VDC battery 34, switching of the 12 VDC converter 40 depending on the presence or absence of a 110 VAC power supply, and switching of the 110 VAC inverter 42 and 110 VAC battery charger 78 depending on the presence or absence of a 110 VAC power supply.

As for the 12 VDC battery 34, it is contemplated that a 400 AH lithium-ion battery 34 be employed in the disclosed self-contained energy storage, distribution, and monitoring device 50, primarily due to their: (1) greater specific energy (Wh/kg) and energy density (Wh/l), making them smaller and lighter; (2) increased useful life span (from 2 years to 5 to 10 years); (3) being maintenance free; and (4) not requiring venting. However, 12 VDC lithium iron phosphate batteries 34, which are the safest 12 VDC batteries 34 and match the automotive voltage the best, have an even flatter voltage profile than do lead-acid 12 VDC batteries 34, and commercial, off-the-shelf (COTS) lithium iron phosphate 12 VDC batteries 34 are known to drop off the end with little warning. Such behavior makes the use of a lithium iron phosphate 12 VDC batteries 34 for the towed vehicles 10, such as recreational vehicles, preferred as the master 12 VDC battery 34 due to their higher reliability, as the state of charge when the towed vehicle 10 is hooked to the towing vehicle 26 is most likely unknown and the given the need for immediate actuation of the electrically actuated braking system 46 in the event of an uncoupling of the towed vehicle 10 and the towing vehicle 26 while in transit.

The self-contained energy storage, distribution, and monitoring device 50 disclosed herein contemplates a 400 AH battery 34 and a 3500 watt inverter 42, although other models may be rated for more or less energy. Although the disclosed self-contained energy storage, distribution, and monitoring device 50 is primarily directed to the recreation vehicle market, it can be applied and modified for marine, home or off grid system use.

Figure 5:
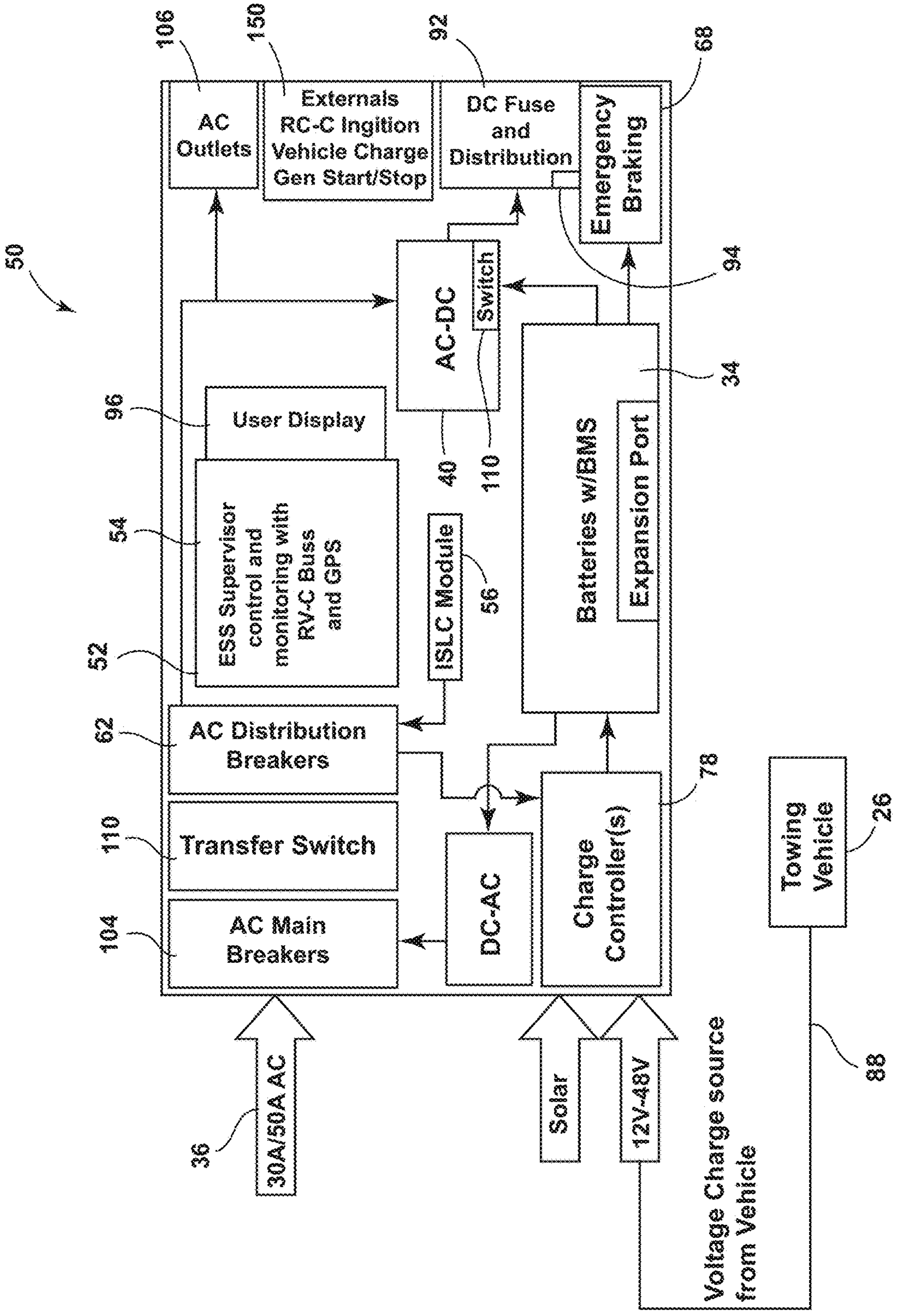
FIG. 5 is a schematic view of the self-contained energy storage, distribution, and monitoring device shown in FIG. 2 according to the present disclosure.

As shown in FIG. 5, the self-contained energy storage, distribution, and monitoring device 50 may include multiple input power sources. These input power sources may include a 120 VAC/240 VAC 60 Hz, 30 A/50 A power supply input 36, depending on system rating. 110 VAC power supply input 36 may be from the grid system or from a generator. The input power sources may also include 12 VDC input 88 from the towing vehicle 26 or supplemental battery or alternator. Finally, the input power source may include the solar battery charger 86 input connection for solar panels.

The self-contained energy storage, distribution, and monitoring device 50 may also include several outputs. As also shown in FIG. 5, the self-contained energy storage, distribution, and monitoring device 50 may include individual 120 VAC breaker protected branch circuits 90 connected to WAGO-type quick terminals for easy wiring of branch circuit loads. The self-contained energy storage, distribution, and monitoring device 50 may also include individual fused 12 VDC branch circuits 92 and distribution thereof. Blown fuse indicators 94 may be reported to the ESS supervisor module 54, as further discussed below. Loads may be monitored and controlled via the ISLC module 56.

Figure 11:
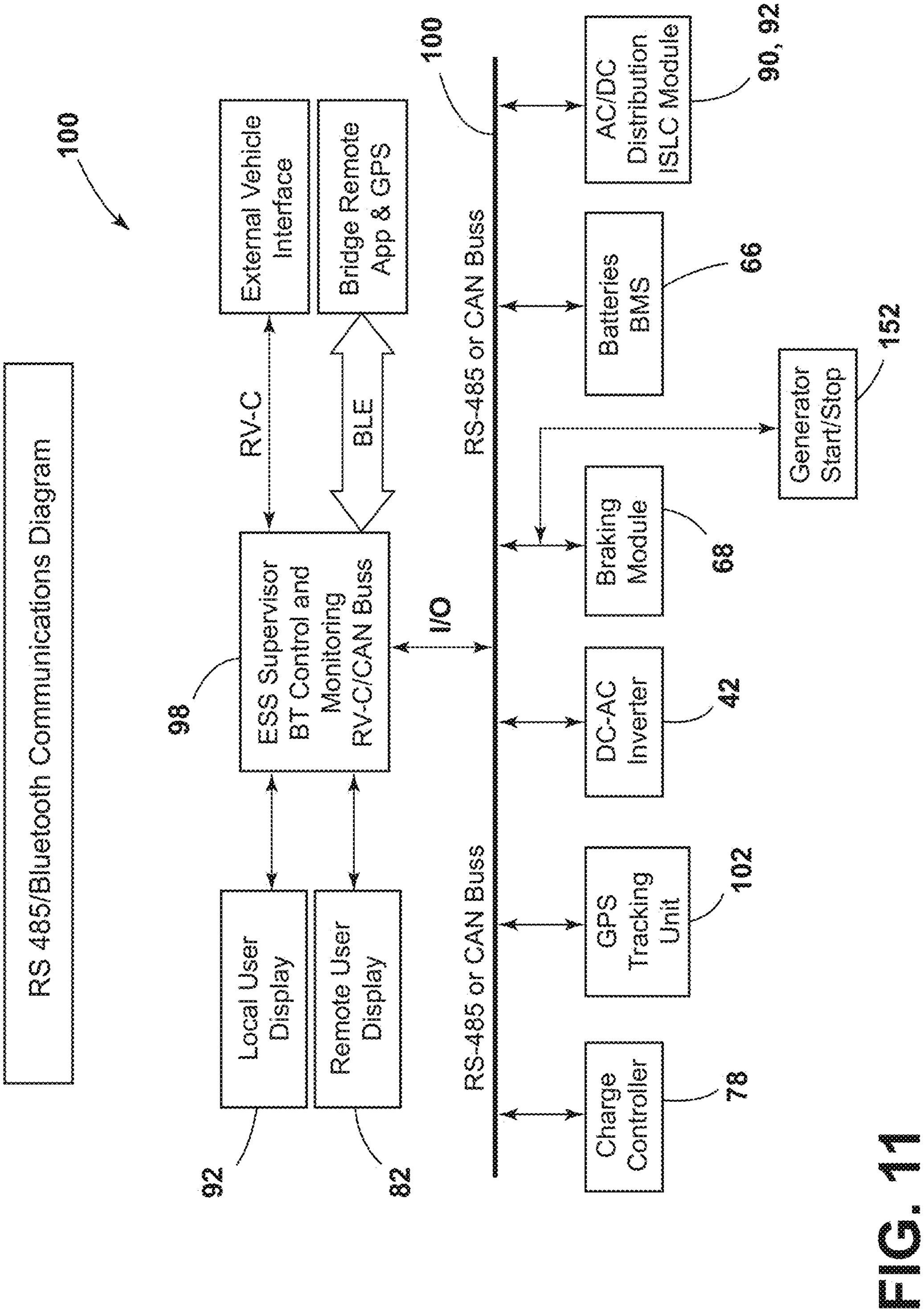
FIG. 11 is a block diagram of the communication bus of the self-contained energy storage, distribution, and monitoring device shown in FIG. 2 according to the present disclosure.

The disclosed energy storage, distribution, and monitoring device 50 may also include the ESS supervisor module 54 mounted within the enclosed housing 60 on the towed vehicle 10 or larger, self-propelled motor vehicle and operably coupled with the controller 52. The ESS supervisor module 54, which may be integrated with or resident in the controller 52 or may be configured as a stand-alone computational unit, communicates with each of the ESS supervisor module's 54 major components to provide system control and status reporting to the user. User interface may be provided both on a locally mounted display 96, as well as an optional remote display 82. In addition, the self-contained energy storage, distribution, and monitoring device 50 may further include several other features, such as Bluetooth/wireless monitoring and surge/power control. A Bluetooth interface 98 to a user device via a custom application may be provided. A communication protocol may be included to allow remote communication with the ESS supervisor module 54 via cellular or Wi-Fi network. A GPS tracking unit 102 may allow location to be tracked from any phone or computer. An internal RS-485 Buss 100 (or other protocol) may be provided to establish communications with each component, as shown in FIG. 11. An optional CAN Buss (RVCAN or similar) may be provided to communicate with the towed vehicle's 10 existing systems.

Local displays 96 and remote displays (not shown) may provide detailed and up to date status information, including but not limited to: (1) percent 12 VDC battery 34 charge; (2) time to full charge at current rate; (3) charge current and voltage power; (4) time to full discharge at current rate; (5) 12 VDC battery 34 discharge current, voltage and power; (6) inverter 42 status; (7) solar charger/panel input 86 status; (8) blown fuse indicator 94 on a VDC branch; (9) 110 VAC branch circuit 90 loads; and (10) emergency braking system module 68 status.

As shown in FIG. 5, the ESS supervisor module 54 may take AC power from "shore power" when present and converts part of it to 12 VDC to power the 12 VDC appliances and elements within the towed vehicle 10. The AC power input 36 also passes though the 110 VAC breaker protected branch circuits 90 to the 110V appliances and items. The 110 VAC power supply input 36 also charges the 12 VDC battery 34.

When no "shore power" power is detected, the ESS supervisor module 54 switches automatically to 12 VDC battery 34 power, delivering 12 VDC directly and providing 110 VAC via the integrated inverter 42. While operating on 12 VDC battery 34 power, the self-contained energy storage, distribution, and monitoring device 50 provides "intelligent" priority circuitry to manage the distribution of power so that load surges do not occur simultaneously or when the total load will result in the inverter 2 "dropping out." The self-contained energy storage, distribution, and monitoring device 50 also improves the efficiency of gasoline or diesel fueled generators, as the 12 VDC battery 34 accepts 100% of the energy from the battery charger 78, as opposed to when running without a 12 VDC battery 34 as a buffer, which may require three times the generator capacity and fuel consumption.

As shown in FIG. 5, a single 30 A or 50 A main breaker 104 may protect the 15/20 Amp branch circuits 90 connecting to it. On a 50 A version, a second 20 A breaker 104 may be added to protect a second group of 15/20 A branch circuits 90.

The AC breaker and distribution panel 62 may contain the 120 VAC branch circuit breakers 104, with quick connect wiring at each branch circuit 90. Optional AC power outlets 106 may be mounted to the AC breaker and distribution panel 62 for user convenience.

The ESS supervisor module 54 also may include a pure sinewave inverter 42, which converts DC to AC routed to a switch 108 to supply power when external AC power is not available. RS-485 (or other protocol) communications buss 100 may provide both remote parameter setting and data reporting, including faults or errors to the ESS supervisor module 54.

The ESS supervisor module 54 may further include an AC-DC switch 110. The AC-DC switch 110 may provide DC power when 12 VDC batteries 34 are unavailable or may provide additional DC power for higher current demand devices. The AC-DC switch 110 detects the presence and status of the 12 VDC battery 34 and may automatically route DC power when the 12 DVC battery 34 is not available. Communications with the ESS supervisor module 54 is provided via RS-485 communications buss 100 or other protocol.

The fused individual DC branch circuits 92 may be provided with quick connect wiring to each circuit 92. Blown fuse indicators 94 on each branch circuit 92 give quick indication of branch circuit 92 status. The self-contained energy storage, distribution, and monitoring device 50 may also communicate with the ISLC module 56 to provide DC branch switching and load control, as well as branch current monitoring. Communications may be provided via the RS-485 communications buss 100 or other protocols connected to the ESS supervisor module 54 and or the ISLC module 56.

Figure 6:
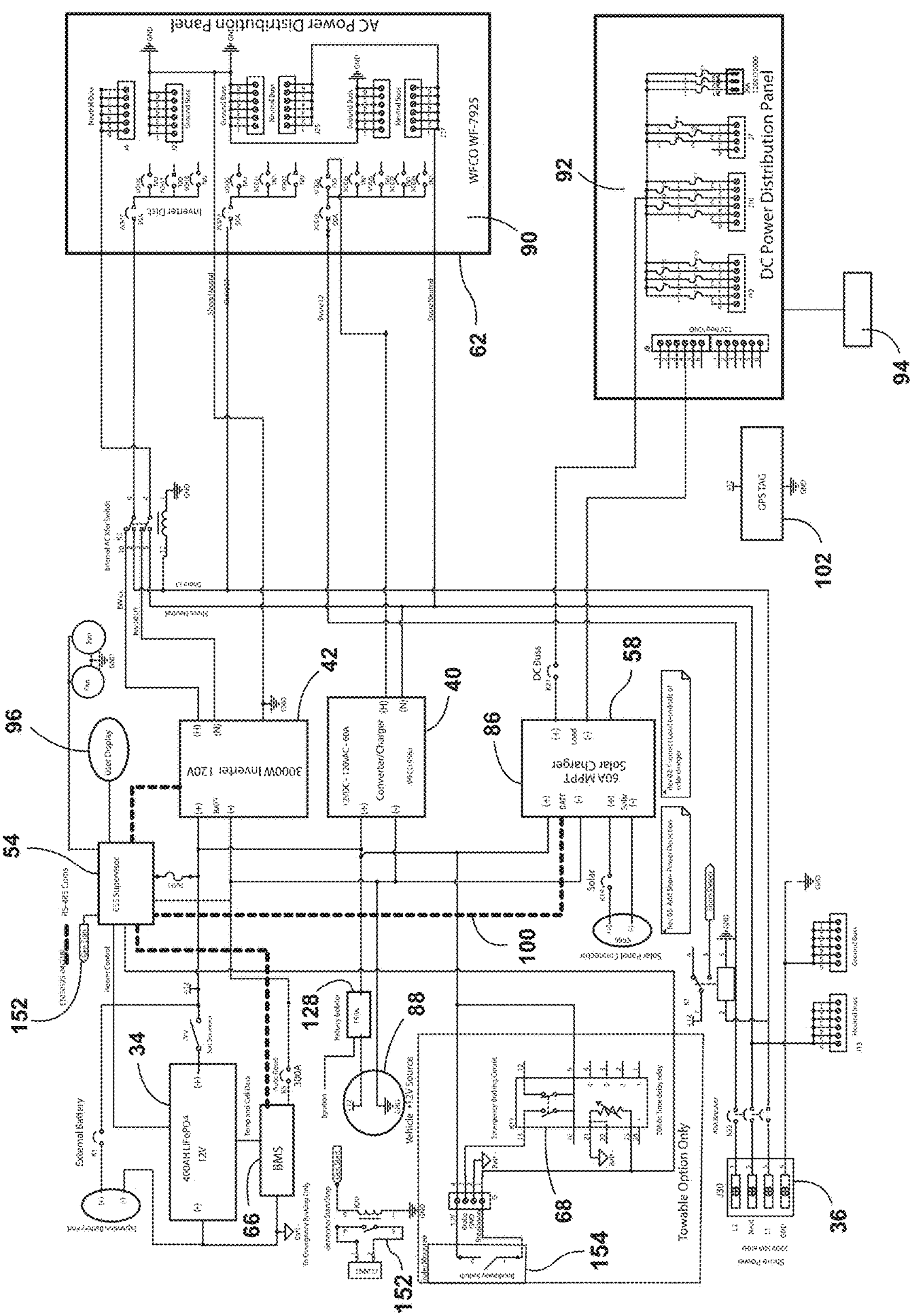
FIG. 6 is a circuit diagram of the self-contained energy storage, distribution, and monitoring device shown in FIG. 2 according to the present disclosure, adapted for 12V systems.
Figure 7:
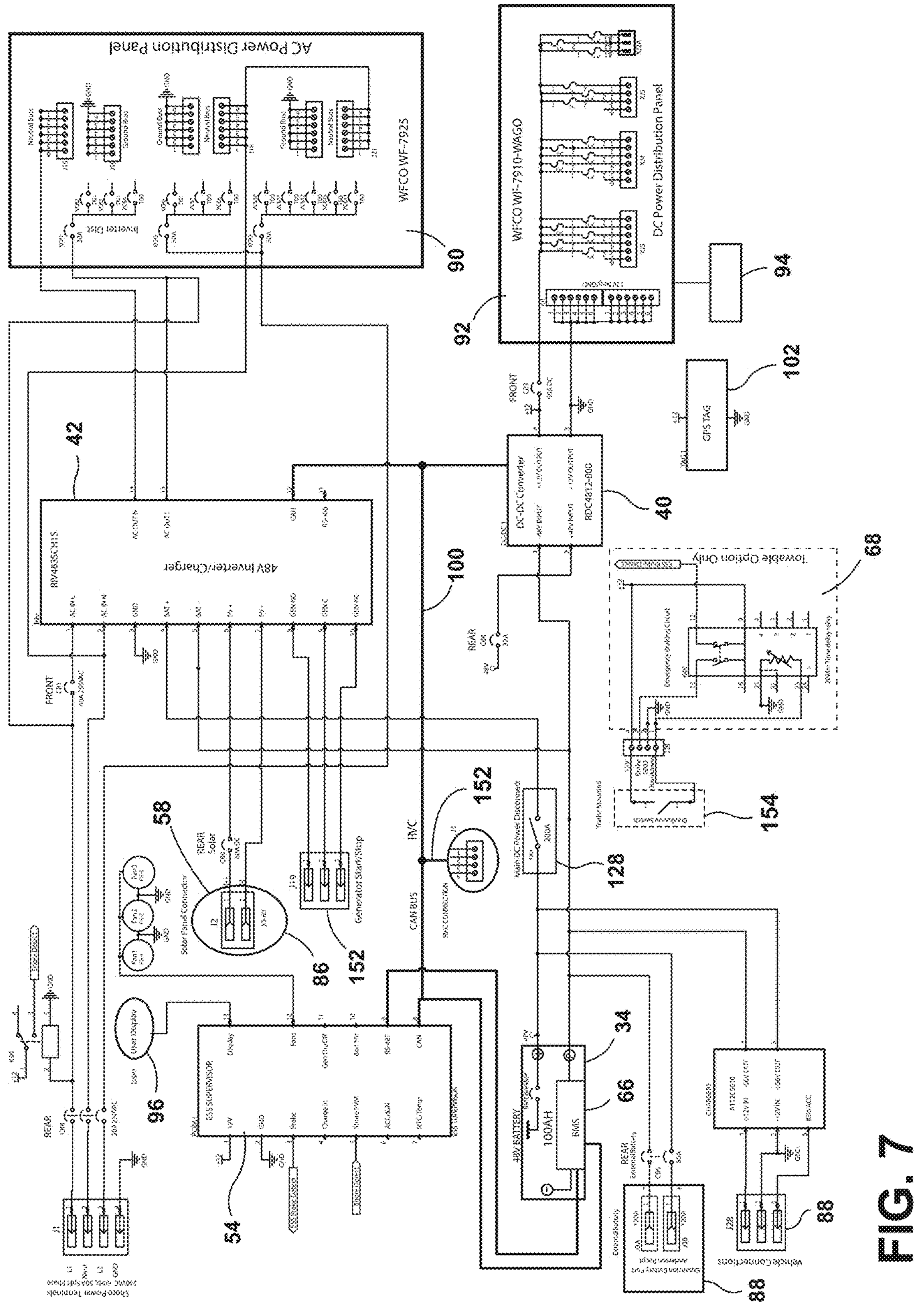
FIG. 7 is a circuit diagram of the self-contained energy storage, distribution, and monitoring device shown in FIG. 2 according to the present disclosure, adapted for 48V systems.

FIG. 6 depicts a circuit diagram of the self-contained energy storage, distribution, and monitoring device 50, adapted for 12V systems. FIG. 7 depicts a circuit diagram of the self-contained energy storage, distribution, and monitoring device 50, adapted for 48V systems. Each of these circuit diagrams depicts the components noted above, including a generator start/stop circuit. Further, some of the features in the block diagram shown in FIGS. 4, 5, and 11, may be integrated into one or more of the individual internal components, such as the transfer switches, and external components 150, such as a generator start stop 152.

The ISLC module 56, which may also be integrated with or resident in the controller 52 with the ESS supervisor module 54 or may be configured as a stand-alone computational unit, may be primarily tasked with conserving 12 VDC battery 34 capacity. This can be accomplished by limiting peak load demands that occur during start up, or multiple loads running at the same time. This may be done by assigning load priorities, forecasting, or predictive load scheduling to conserve available 12 VDC battery 34 reserve.

An example would be a towed vehicle 10 with both front and rear air conditioning units 112. During operation both a fan and a compressor may be running, other times it might be just the fan. When a compressor starts, it draws many times more power than while it is normally running. This is generally a short amount of time, but still an increase in 12 VDC battery 34 demand. By monitoring the status of both air conditioning units 112 and whether the compressor is running or in "Start-Up" mode, the ISLC module may "hold" the startup of one air conditioning 112 compressor while the other one finishes its startup cycle, thus reducing the deep draw on the battery 34 for that period.

By assigning priorities to each branch circuit 92, the ISLC module 56 can make decisions based on 12 VDC battery 34 levels and whether to allow a branch circuit 92 to provide power. For example, if the 12 VDC battery 34 is nearing its low state, only higher priority branch circuits 92 may be given power. Communicating with thermostats and other appliance controllers, or even occupancy sensors, might further improve the effectiveness of the ISLC module 56.

Predictive load control may further help the ISLC module 56 make branch circuit 92 decisions. By monitoring and learning branch circuit 92 load patterns, the ISLC module 56 may reduce the chance of multiple high-power branch circuits 92 activating at the same time, for example a refrigerator may have a common pattern of running for a short time to meet the temperature setting, once it reaches the set temperature, it will be drawing little to no power until the temperature drops again. This pattern can be learned and allow other branch circuits 92 to "startup" or run only while the refrigerator is in its idle state.

The ISLC module 56 may also allow a user to control the self-contained energy storage, distribution, and monitoring device 50 via a phone app, or a remote control, which may allow for even more possible energy savings, by setting branch circuit 92 schedules.

The ISLC module 56 may also include a manual or automatic switch 114 that routes AC power to the 110 VAC power supply input 36 or the DC-AC inverter 42 to the AC main breaker and distribution panel 62. If an automatic switch 114, it will disconnect the inverter 42 output upon detection of power at the 110 VAC power supply input 36 connections. It should be noted that power from the AC breaker and distribution panel 62 will provide power to the battery chargers 78 to keep the 12 VDC battery 34 charged. This switch 114 may be internal or external. Retrofit applications may be provided with this switch 114.

The ISLC module 56 thus performs its main task of conserving the 12 VDC battery 34 capacity or state of charge (SOC) by reducing the amount and number of higher power loads. This may be accomplished by monitoring overall 12 VDC battery 34 status (communicating with the BMS module) and the overall load demand, as well as individual branch circuit 92 load demand and user input.

When applied to a towed vehicle 10, the self-contained energy storage, distribution, and monitoring device 50 may further include the BMS module 66. That is, after being transported and parked, when the towing vehicle 26 is disconnected, the electrically actuated braking system 46 may automatically lock the wheel and tire assemblies 16, which will prevent the towed vehicle 10 from moving. However, leaving the electrically actuated braking system 46 locked will run down the 12 VDC battery 34. The BMS module 66 disconnects all internal branch circuits 92 upon disconnection of the towed vehicle 10 from the towing vehicle 26 to ensure that the 12 VDC battery 34 is not run down by something left on. As an override, internal branch circuits 92 may be activated by turning on a breaker inside the circuit breaker and distribution panel 62 inside the towed vehicle 10. Towed vehicle 10 may be fitted with a timer to disconnect the 12 VDC battery 34 after a fixed period (normally 5-20 minutes) so as not to run the 12 VDC battery 34 down. The branch circuits 92 may be activated by re-connecting a towing vehicle 26 and, upon disconnecting the towing vehicle 26, the BMS module 66 will automatically turn off all interior branch circuits 92 to prevent the 12 VDC battery 34 from being prematurely discharged and damaged.

The BMS module 66 may be integrated with the 12 VDC battery 34, which may comprise a 12V LiFePO battery or other type. The BMS module 66 monitors, controls, and reports 12 VDC battery 34 charge/discharge, state of charge (SOC), and depth of discharge (DOD). The BMS module 66 may have RS-485 communications buss 100 and/or Bluetooth communications reporting to the ESS supervisor module 54 and/or the user. An expansion port 116 may be provided to allow connection of additional batteries, increasing system capacity.

The 12 VDC battery 34 can be charged via the towing vehicle 26 or the towed vehicle 10 battery chargers 78. 12 VDC battery 34 charging may be potentially available from three separate sources, 12V power input 88, such as a vehicle alternator/battery, an AC source battery charger 78, or solar battery charger input 86 via a solar charge module 58. These may be individual components, or one or more integrated components. Multiple components may be connected and used simultaneously to increase charging current and reduce overall charge time. The RS-485 communication buss 100 (or other) may report to the ESS supervisor module 54. The 12 VDC battery 34 may charge and discharge simultaneously. When a solar charge module 58 is provided, the self-contained energy storage, distribution, and monitoring device 50 can also have solar panels (not shown) connected to via the solar battery charge input 86 to power the RV during sunlight, plus recharge the 12 VDC battery 34 for continuous off-grid system operation.

Figure 8:
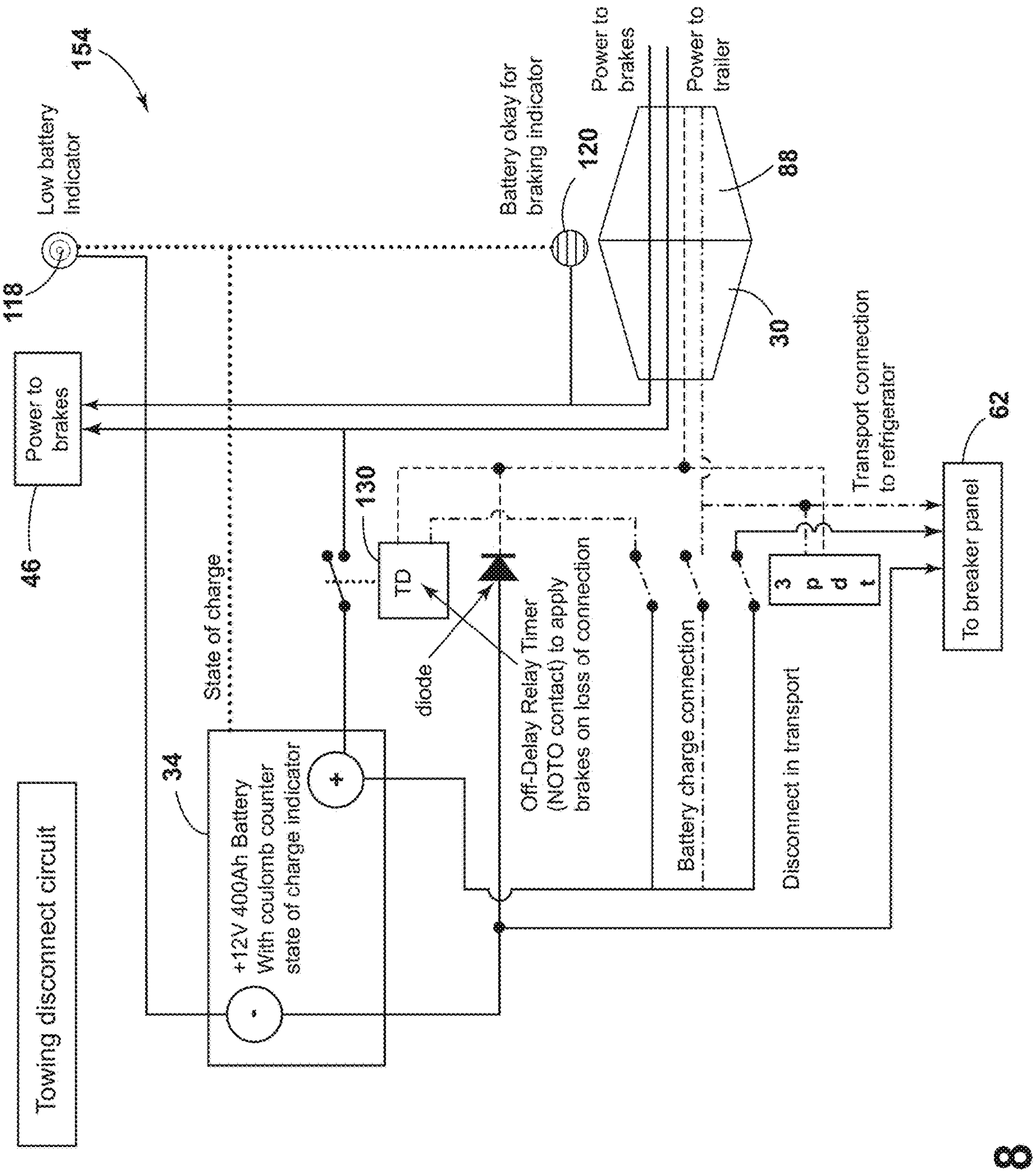
FIG. 8 is a circuit diagram of the emergency braking module of the self-contained energy storage, distribution, and monitoring device shown in FIG. 2 according to the present disclosure.

The emergency braking system module 68 provides emergency braking to the towed vehicle 10, where power from the 12 VDC battery 34 is routed to the towed vehicle's 10 electrically actuated braking system 46 upon vehicle separation from the towed vehicle 10 activating the towed vehicle's 10 breakaway switch 70. As a first function, the emergency braking system module 68 signals the user whether the 12 VDC battery 34 has sufficient capacity to meet the braking requirements via a low battery indicator 118 and 12 VDC battery 34 "okay for braking" indicator 120, as shown in FIGS. 7 and 8. The emergency braking system module 68 provides an external indication of the 12 VDC battery 34 being at a low state of charge and needing re-charging to prevent damage. The emergency braking system module 68 thus provides an electronic circuit added safety by ensuring that the user knows that the 12 VDC battery 34 is adequately charged to provide the needed emergency braking upon becoming disconnected.

Figure 10:
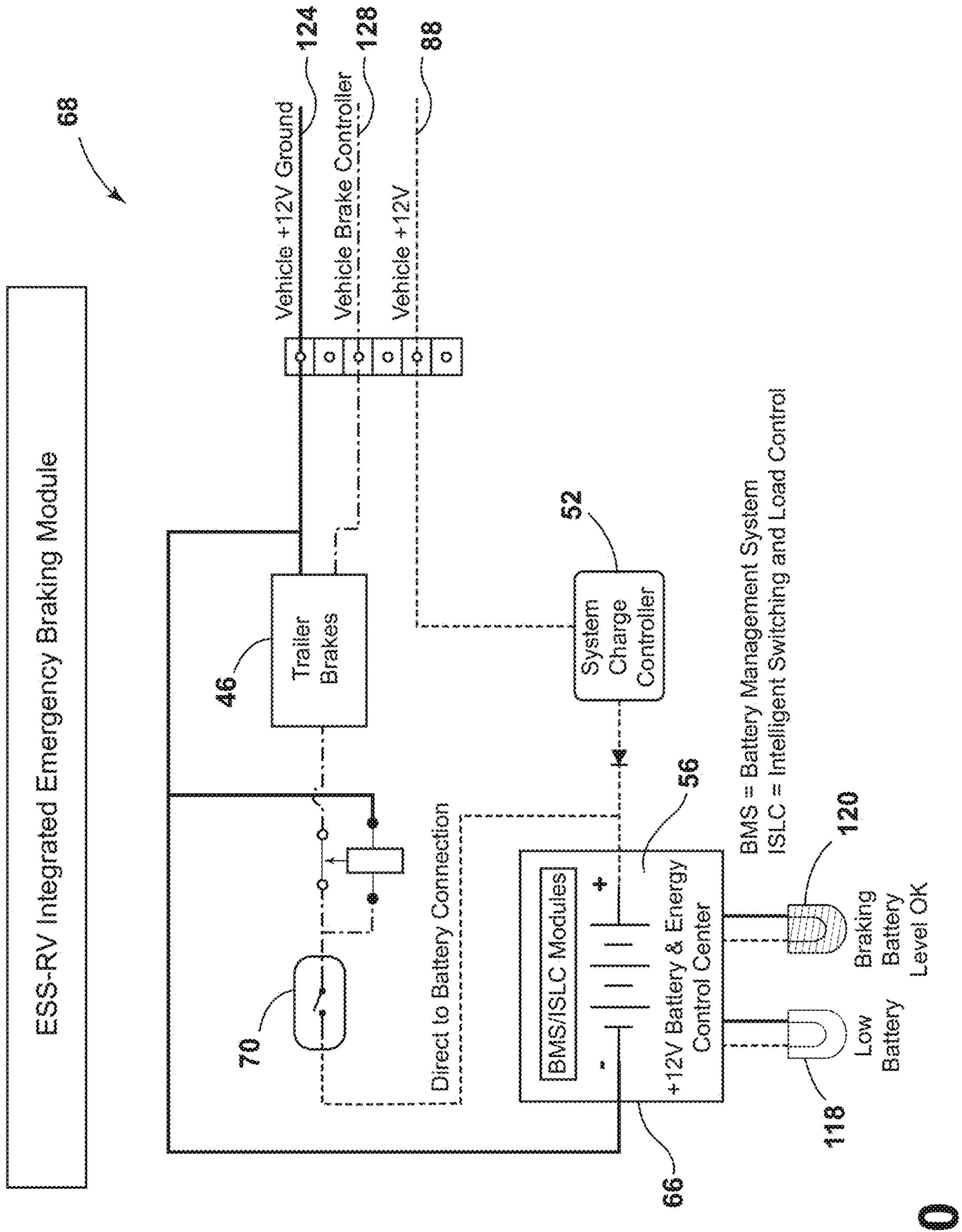
FIG. 10 is another circuit diagram of the emergency braking module of the self-contained energy storage, distribution, and monitoring device shown in FIG. 2 according to the present disclosure.

The emergency braking system module 68 will provide the required power and actuate the electrically actuated brake system of the towed vehicle 10 if the towed vehicle 10 becomes disconnected from the towing vehicle 26. Direct input from the towed vehicle's 10 breakaway switch 70 activates the emergency braking system module 68, as shown in FIG. 10. Typically, this is activated from cable 84 by which the breakaway switch 70 is connected to towing vehicle 26, as noted above. The ESS supervisor module 54 ensures enough power (battery SOC) is available for the electrically actuated brake system 46 of the towed vehicle 10 and may report this information via indicator lights, as well as a message displayed in the user display 96 and a status message to a user's phone via Bluetooth.

Figure 9:
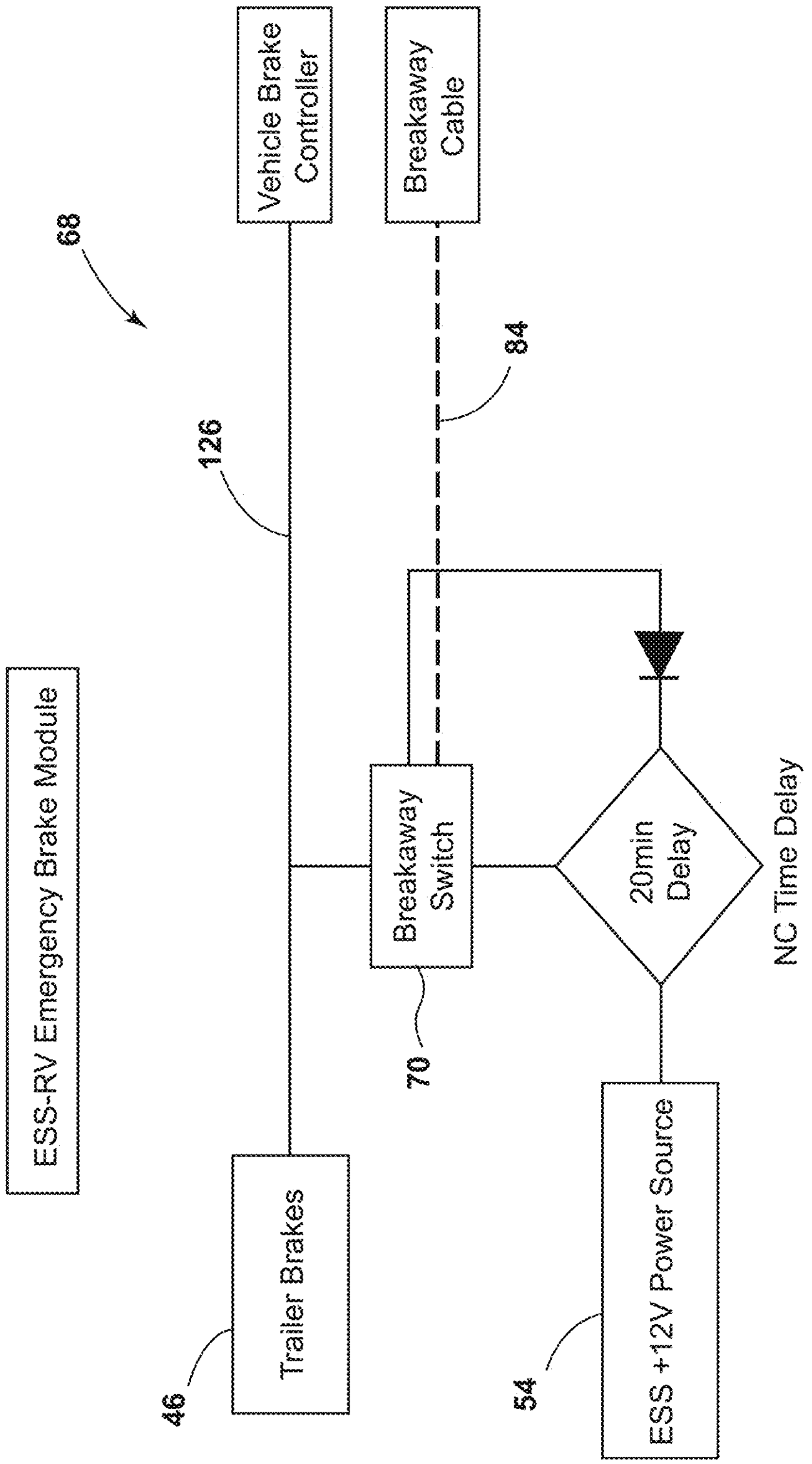
FIG. 9 is a schematic view of the emergency braking module of the self-contained energy storage, distribution, and monitoring device shown in FIG. 2 according to the present disclosure.

As depicted in FIGS. 8, 9, and 10, the emergency braking system module 68 is in signal communication with the towing vehicle 26 brake system and controller (via a 12 VDC power input 88, a 12 VDC ground line 124, and towing vehicle 26 brake controller signal line 126) when the towed vehicle 10 is normally coupled with the towing vehicle 26. As shown in FIG. 10, the electrically actuated brake system 46 of the towed vehicle 10 is directed coupled with the 12 VDC input 88 and the 12 VDC ground line 124, while the towing vehicle brake controller signal line 126 communicates with the BMS module 66 and ISLC module 56, as well as the breakaway switch 70, via a back feed protection diode 128. The BMS module 66, as noted above, is provided with a low battery indicator 118 and braking battery level "okay for braking" indicator 120.

The BMS module 66 and ISLC module 56 are also in communication with a timed open delay module 130. The timed open delay module 130 is also in communication with the breakaway switch 70 and the towing vehicle 12 VDC input 88 and the 12 VDC ground line 124. In the event of an uncoupling of the towed vehicle 10 and the towing vehicle 26 while in transit, the breakaway switch 70 is actuated, and the emergency braking system module 68 applies power from the 12 VDC battery 34 within the ESS supervisor module 54 instantly. The timed open delay module 130 may provide that the electrically actuated brake system 46 of the towed vehicle 10 remains active for a predetermined period, such as 20 minutes. As noted above, reconnecting the towed vehicle 10 with the towing vehicle 26, resetting the breakaway switch 70, or an override signal from the ESS supervisor module 54 may be used to release the electrically actuated brake system 46 of the towed vehicle 10. In addition, the BMS module 66 may apply the electrically actuated brake system 46 of the towed vehicle 10 for a fixed period after which all internal branch circuits 92 are disconnected to ensure the 12 VDC battery 34 is not discharged by accident by leaving appliances on.

The self-contained energy storage, distribution, and monitoring device 50 may also be provided with remote monitoring via an optional GPS tracking unit 102 to add a security feature. There are several methods of accomplishing this feature and the GPS tracking unit 102 may be mechanically attached to the towed vehicle 10 (most likely underneath the cabinetry), which would make this feature very difficult to remove or disable.

The self-contained energy storage, distribution, and monitoring device 50 may be used to connect the 12 VDC battery 34 to the towing vehicle 26 to charge while in transit. The self-contained energy storage, distribution, and monitoring device 50 can be integrated into an existing towed vehicle 10 or larger, self-propelled vehicle control/power system. The self-contained energy storage, distribution, and monitoring device 50 minimizes or removes reliance of gasoline or diesel fueled generators for remote/off-grid system applications and provides design flexibility for manufacturers of towed vehicles 10 or larger, self-propelled vehicles because gasoline or diesel fueled generators require special ventilation and other constraints, for example, windows cannot be located above a gasoline or diesel fueled generators. A GPS tracking unit 102 providing a security feature may be included for tracking. The self-contained energy storage, distribution, and monitoring device 50 provides a fully integrated energy storage system for towed vehicles 10, such as recreational vehicles, and similar vehicles and applications, and includes the circuit breaker and distribution panel 62, battery, 12 VDC converter 40, 110 VAC inverter 42, 110 VAC battery charger 78, and solar battery charger input 86, as well the ability to charge from a towing vehicle 26 and safety features herein described.

The emergency braking system module 68 automatically connects the 12 VDC battery 34 to the electrically actuated braking system 46 of the towed vehicle. The emergency braking system module 68 removes the need for an additional circuit and 12 VDC battery 34 commonly installed on towed vehicles 10. The emergency braking system module 68 may be programed to lock the wheel and tire assemblies 16 of the towed vehicle 10 on disconnection from the towing vehicle 26 for a predetermined period.

The ISLC module 56 maximizes 12 VDC battery 34 capacity and prevents damage to the system. The ISLC module 56 provides an external signal when the 12 VDC battery 34 reaches a low state of charge and provides current 12 VDC battery 34 and load status to the user in real time. In addition, in the case of a towed vehicle 10, the ISLC module 56 may be programmed to disconnect the interior power from the towed vehicle 10 so as not to run down the 12 VDC battery 34 in transit and to discourage occupants riding in the towed vehicle 10 illegally. Alter-natively, the ISLC module 56 may be programed to disconnect all interior electrical devices when the towed vehicle 10 is coupled with the towing vehicle 26, except for the refrigerator, to aid in discouraging riding in the towed vehicle 10 illegally. The ISLC module 56 may also provide "intelligent" priority switching of the AC outlets 106 to minimize the occurrence of load surges when the existing load is of a value such that the combination will cause the inverter 42 to "drop out" or disconnect.

The disclosed self-contained energy storage, distribution, and monitoring device 50 thus represents an integrated installation unit. Currently, manufacturers of recreational vehicles purchase all components separately and then spend hours assembling them and making the appropriate electrical wiring connections. This approach also takes up a considerable amount of space distributed throughout the recreational vehicle.

The disclosed self-contained energy storage, distribution, and monitoring device 50 can accomplish its objectives in one easy to install box-like enclosed housing 60. That is, the self-contained energy storage, distribution, and monitoring device 50 may be readily and easily installed, saving hours of wiring individual components. The self-contained energy storage, distribution, and monitoring device 50 may only weigh approximately 150 lbs. Inventory is simplified, in that only a single part number is required for multiple components, eliminating possible inventory issues and concerns. The relatively small footprint for the self-contained energy storage, distribution, and monitoring device 50 allows for more storage and flexibility on the interior of towed vehicle 10.

In summary, the disclosed self-contained energy storage, distribution, and monitoring device 50 disclosed herein is a unit that simultaneously provides energy storage, distribution, emergency braking, and overall system monitoring within an intelligent system. The self-contained energy storage, distribution, and monitoring device 50 provides a fully integrated energy storage system for towed vehicles 10, such as recreational vehicles, and similar vehicles and applications, and includes the circuit breaker and distribution panel 62, 12 VDC battery 34, 12 VDC converter 40, 110 VAC inverter 42, 110 VAC battery charger 86, and solar battery charger input 78. In addition, in the case of a towed vehicle 10, the disclosed self-contained energy storage, distribution, and monitoring device 50 provides increased safety on the road to the manufacturer, dealer, transport company, and owner and may prevent costly damage to the 12 VDC battery 34, as well the ability to charge from towing vehicle 26 and safety features herein described.

It should be understood that variations, modifications, and improvements can be made on the aforementioned self-contained energy storage, distribution, and monitoring device 50 without departing from the concepts of the present disclosure, and further it is to be understood that such concepts are intended to be covered by the following claims unless these claims by their language expressly state otherwise.

What is claimed is:

1. A self-contained energy storage, distribution, and monitoring device for a vehicle comprising:

a single enclosed box-like housing forming an integrated installation unit adapted for mounting within a recess of the vehicle;

a VDC battery disposed within the enclosed box-like housing;

a VDC converter disposed within the enclosed box-like housing;

a 110 VAC power input, a 110 VAC inverter and 110 VAC battery charger, each disposed within the enclosed box-like housing;

a VDC power input disposed within the enclosed box-like housing, and a controller disposed within the enclosed box-like housing and operably coupled with the VDC battery, the VDC converter, the 110 VAC power input, the 110 VAC inverter, and the 110 VAC battery charger;

wherein the controller is adapted to provide charging and discharging control of the VDC battery, switching of the VDC converter depending on the presence or absence of a 110 VAC power supply, and switching of the 110 VAC inverter and 110 VAC battery charger depending on a presence or absence of a 110 VAC power supply.

2. The self-contained energy storage, distribution, and monitoring device of claim 1, wherein the self-contained energy storage, distribution, and monitoring device further comprises a plurality of fused individual direct current branch circuits with a plurality of blown fuse indicators on each branch to provide an indication of branch status.

3. The self-contained energy storage, distribution, and monitoring device of claim 2, wherein the fused individual direct current branch circuits are equipped with quick connect wiring to each circuit.

4. The self-contained energy storage, distribution, and monitoring device of claim 2, further comprising a plurality of individual branch alternating current circuits and an individual branch circuit breaker adapted to limit the current to each of the individual branch alternating current circuits and the controller provides further real time status information including alternating current circuit branch circuit loads and blown fuse status of the fused individual direct current branch circuits.

5. The self-contained energy storage, distribution, and monitoring device of claim 1, wherein the vehicle comprises a towed vehicle having an electrically actuated braking system, and wherein:

the controller is adapted to actuate automatic braking control of the electrically actuated braking system of the towed vehicle in electrical communication with a braking system of a towing vehicle;

the controller ensures that the VDC battery has sufficient energy to actuate the electrically actuated braking system of the towed vehicle before allowing the towed vehicle to be towed;

the controller is in signal communication with a breakaway switch, the electrically actuated braking system of the towed vehicle, and the VDC battery via an internal bus and bus protocol;

the controller is in selective electrical communication with the electrically actuated braking system of the towed vehicle; and the controller directs electrical energy from the VDC battery to the electrically actuated braking system of the towed vehicle in the event of the towed vehicle breaking free from the towing vehicle while in transit.

6. The self-contained energy storage, distribution, and monitoring device of claim 5, wherein the controller disconnects all 110 VAC branch circuits except for a refrigerator circuit when an input from the VDC power input from the towing vehicle is detected to discouraging occupants in the towed vehicle while in motion.

7. The self-contained energy storage, distribution, and monitoring device of claim 5, further comprising an electrical circuit that actuates the electric braking system of the towed vehicle for a fixed period after which all of a plurality of VDC branch circuits and a plurality of a plurality of 110 VAC branch circuits are disconnected to ensure the VDC battery is not discharged by an active appliance on the towed vehicle.

8. The self-contained energy storage, distribution, and monitoring device of claim 1, wherein the controller comprises an energy storage system supervisor module and the self-contained energy storage, distribution, and monitoring device further comprises an alternating current supply power input, wherein the controller selectively electrically couples the alternating current supply power input with the energy storage system supervisor module to charge the energy storage system supervisor module if a charge of the energy storage system supervisor module falls below a predetermined level.

9. The self-contained energy storage, distribution, and monitoring device of claim 8, wherein the self-contained energy storage, distribution, and monitoring device further comprises a direct current to alternating current inverter and a switch adapted to disconnect an output from the direct current to alternating current inverter upon detection of power at the 110 VAC power input.

10. The self-contained energy storage, distribution, and monitoring device of claim 8, wherein the energy storage system supervisor module comprises a VDC lithium battery and the controller is adapted to provide integrated battery management that monitors, controls and reports battery charge/discharge, battery state of charge, and depth of charge.

11. The self-contained energy storage, distribution, and monitoring device of claim 1, wherein the self-contained energy storage, distribution, and monitoring device further comprises a main alternating current breaker adapted to limit the current directly from the 110 VAC power input.

12. The self-contained energy storage, distribution, and monitoring device of claim 11, wherein the self-contained energy storage, distribution, and monitoring device further comprises a plurality of individual branch alternating current circuits and an individual branch circuit breaker adapted to limit the current to each of the individual branch alternating current circuits.

13. The self-contained energy storage, distribution, and monitoring device of claim 1, wherein the controller is further adapted to provide predictive load control by monitoring and learning a branch load pattern of a plurality of 110 VAC branch circuits to reduce incidences of multiple higher-power demand circuits activating at the same time.

14. The self-contained energy storage, distribution, and monitoring device of claim 1, further comprising a wireless communication portal by which a cellular, Bluetooth, or Wi-Fi signal may be used to remotely provide an input command to the controller and obtain real-time status information on one or more of percent a battery charge, a time to fully charge at current rate, a charge current, a voltage, a time to full discharge at current rate, a battery discharge current, an inverter status, and/or a solar charger status.

15. The self-contained energy storage, distribution, and monitoring device of claim 1, wherein the self-contained energy storage, distribution, and monitoring device further comprises an alternating current outlet.

16. The self-contained energy storage, distribution, and monitoring device of claim 1, wherein the self-contained energy storage, distribution, and monitoring device further comprises a solar power input and the controller selectively electrically couples the solar power input with an energy storage system supervisor module to charge the energy storage system supervisor module if a charge of the energy storage system supervisor module falls below a predetermined level.

17. A self-contained energy storage, distribution, and monitoring device comprising a box-like housing forming an integrated installation unit and adapted to actuate automatic braking control of, and mounted within a recess on, a towed vehicle equipped with an electrically actuated braking system in electrical communication with a braking system of a towing vehicle, the self-contained energy storage, distribution, and monitoring device comprising:

an electrical connection with a breakaway switch mounted on the towed vehicle and operably coupled with the towing vehicle;

a controller mounted within the box-like housing and operably coupled with the breakaway switch; and an energy storage system supervisor module mounted within the box-like housing and operably coupled with the controller, wherein the energy storage system supervisor module is in selective electrical communication with the electrically actuated braking system of the towed vehicle;

wherein the controller ensures that the energy storage system supervisor module has sufficient energy to actuate the electrically actuated braking system of the towed vehicle before allowing the towed vehicle to be towed; and wherein the controller directs electrical energy from the energy storage system supervisor module to the electrically actuated braking system of the towed vehicle in the event of the towed vehicle breaking free from the towing vehicle while in transit.

18. The self-contained energy storage, distribution, and monitoring device of claim 17, wherein the controller continually monitors the energy storage system supervisor module to ensure sufficient energy to stop the towed vehicle exists, charging the energy storage system supervisor module, and/or providing electrical energy to the towed vehicle.

19. A self-contained energy storage, distribution, and monitoring device comprising a box-like housing forming an integrated installation unit and adapted to actuate automatic braking control of, and mounted within a recess on, a towed vehicle equipped with an electrically actuated braking system in electrical communication with a braking system of a towing vehicle, the self-contained energy storage, distribution, and monitoring device comprising:

an electrical connection with a breakaway switch mounted on the towed vehicle and operably coupled with the towing vehicle;

a controller mounted within the box-like housing and operably coupled with the breakaway switch; and an energy storage system supervisor module mounted within the box-like housing and operably coupled with the controller, wherein the energy storage system supervisor module is in selective electrical communication with the electrically actuated braking system of the towed vehicle;

wherein the electrical connection with the breakaway switch, controller, and energy storage system supervisor module are enclosed within the box-like housing mounted to the towed vehicle and the controller is in signal communication with the breakaway switch, the electrically actuated braking system, and the energy storage system supervisor module via an internal bus and bus protocol;

wherein the controller ensures that the energy storage system supervisor module has sufficient energy to actuate the electrically actuated braking system of the towed vehicle before allowing the towed vehicle to be towed; and wherein the controller directs electrical energy from the energy storage system supervisor module to the electrically actuated braking system of the towed vehicle in the event of the towed vehicle breaking free from the towing vehicle while in transit.

20. The self-contained energy storage, distribution, and monitoring device of claim 19, wherein the device further comprises an alternating current supply power input, a direct current to alternating current inverter, and a solar power input, all mounted within the box-like housing and wherein the controller provides real time status information, including percent battery charge, time to fully charge at current rate, charge current, and voltage power, time to full discharge at current rate, battery discharge current, voltage and power, inverter status, solar charger status, and/or an electrically actuated braking system status.

21. A self-contained energy storage, distribution, and monitoring device for a towed vehicle having an electrically actuated braking system comprising:

a single enclosed housing forming an integrated installation unit adapted for mounting within the vehicle;

a VDC battery disposed within the enclosed housing;

a VDC converter disposed within the enclosed housing;

a 110 VAC power input, a 110 VAC inverter and 110 VAC battery charger, each disposed within the enclosed housing;

a VDC power input disposed within the enclosed housing, and a controller disposed within the enclosed box-like housing and operably coupled with the VDC battery, the VDC converter, the 110 VAC power input, the 110 VAC inverter, and the 110 VAC battery charger;

wherein:

the controller is adapted to provide charging and discharging control of the VDC battery, switching of the VDC converter depending on the presence or absence of a 110 VAC power supply, and switching of the 110 VAC inverter and 110 VAC battery charger depending on a presence or absence of a 110 VAC power supply;

the controller is adapted to actuate automatic braking control of the electrically actuated braking system of the towed vehicle in electrical communication with a braking system of a towing vehicle;

the controller ensures that the VDC battery has sufficient energy to actuate the electrically actuated braking system of the towed vehicle before allowing the towed vehicle to be towed;

the controller is in signal communication with a breakaway switch, the electrically actuated braking system of the towed vehicle, and the VDC battery via an internal bus and bus protocol;

the controller is in selective electrical communication with the electrically actuated braking system of the towed vehicle;

the controller directs electrical energy from the VDC battery to the electrically actuated braking system of the towed vehicle in the event of the towed vehicle breaking free from the towing vehicle while in transit; and the controller disconnects all 110 VAC branch circuits except for a refrigerator circuit when an input from the VDC power input from the towing vehicle is detected to discouraging occupants in the towed vehicle while in motion.

22. A self-contained energy storage, distribution, and monitoring device for a towed vehicle having an electrically actuated braking system comprising:

a single enclosed housing forming an integrated installation unit adapted for mounting within the vehicle;

a VDC battery disposed within the enclosed housing;

a VDC converter disposed within the enclosed housing;

a 110 VAC power input, a 110 VAC inverter and 110 VAC battery charger, each disposed within the enclosed housing;

a VDC power input disposed within the enclosed housing, and a controller disposed within the enclosed box-like housing and operably coupled with the VDC battery, the VDC converter, the 110 VAC power input, the 110 VAC inverter, and the 110 VAC battery charger; and an electrical circuit that actuates the electric braking system of the towed vehicle for a fixed period after which all of a plurality of VDC branch circuits and a plurality of a plurality of 110 VAC branch circuits are disconnected to ensure the VDC battery is not discharged by an active appliance on the towed vehicle;

wherein:

the controller is adapted to provide charging and discharging control of the VDC battery, switching of the VDC converter depending on the presence or absence of a 110 VAC power supply, and switching of the 110 VAC inverter and 110 VAC battery charger depending on a presence or absence of a 110 VAC power supply;

the controller is adapted to actuate automatic braking control of the electrically actuated braking system of the towed vehicle in electrical communication with a braking system of a towing vehicle;

the controller ensures that the VDC battery has sufficient energy to actuate the electrically actuated braking system of the towed vehicle before allowing the towed vehicle to be towed;

the controller is in signal communication with a breakaway switch, the electrically actuated braking system of the towed vehicle, and the VDC battery via an internal bus and bus protocol;

the controller is in selective electrical communication with the electrically actuated braking system of the towed vehicle;

the controller directs electrical energy from the VDC battery to the electrically actuated braking system of the towed vehicle in the event of the towed vehicle breaking free from the towing vehicle while in transit.

* * * * *